(12) United States Patent
Kashchenko et al.

(10) Patent No.: US 7,584,508 B1
(45) Date of Patent: Sep. 1, 2009

(54) ADAPTIVE SECURITY FOR INFORMATION DEVICES

(75) Inventors: Nadezhda V. Kashchenko, Moscow (RU); Anton V. Tikhomirov, Moscow (RU); Dmitry A. Polyakov, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 12/357,246

(22) Filed: Jan. 21, 2009

Related U.S. Application Data

(60) Provisional application No. 61/142,088, filed on Dec. 31, 2008.

(51) Int. Cl.
*G06F 11/00* (2006.01)
*G06F 12/14* (2006.01)
*G06F 12/16* (2006.01)
*G08B 23/00* (2006.01)

(52) U.S. Cl. ............................................. 726/25
(58) Field of Classification Search .................. 726/22, 726/23, 24, 25
See application file for complete search history.

(56) References Cited

U.S. PATENT DOCUMENTS

| | | |
|---|---|---|
| 6,611,925 B1 | 8/2003 | Spear |
| 6,842,681 B2 | 1/2005 | Imai et al. |
| 6,978,308 B2 | 12/2005 | Boden et al. |
| 6,996,845 B1 | 2/2006 | Hurst et al. |
| 7,076,650 B1 | 7/2006 | Sonnenberg |
| 7,107,618 B1 | 9/2006 | Gordon et al. |
| 7,124,438 B2 | 10/2006 | Judge et al. |
| 7,146,155 B2 | 12/2006 | Kouznetsov |
| 7,174,566 B2 | 2/2007 | Yadav |
| 7,237,080 B2 | 6/2007 | Green et al. |
| 7,308,703 B2 | 12/2007 | Wright et al. |
| 7,310,817 B2 | 12/2007 | Hinchliffe et al. |
| 7,353,533 B2 | 4/2008 | Wright et al. |
| 7,478,420 B2 | 1/2009 | Wright et al. |
| 7,526,800 B2 | 4/2009 | Wright et al. |
| 2002/0129111 A1 | 9/2002 | Cooper |
| 2003/0120502 A1 | 6/2003 | Robb et al. |
| 2003/0221122 A1 | 11/2003 | Hatori |
| 2004/0123150 A1 | 6/2004 | Wright et al. |
| 2004/0123153 A1 | 6/2004 | Wright et al. |
| 2005/1005557 | 3/2005 | Wright et al. |
| 2005/0120242 A1 | 6/2005 | Mayer et al. |
| 2005/0132184 A1 | 6/2005 | Palliyil et al. |

(Continued)

FOREIGN PATENT DOCUMENTS

WO  WO 2004/057834  8/2004

(Continued)

OTHER PUBLICATIONS

"A Comparison Of Thin And Thick Client Applications For Wireless And Mobile Applications" Retrieved on [Sep. 12, 2008], from the internet using the link <http://www.technologycrafters.com/technologycrafters/documents/Thick%20Vs%20Thin=%20Client.pdf>.

(Continued)

*Primary Examiner*—David Garcia Cervetti
(74) *Attorney, Agent, or Firm*—Patterson, Thuente, Skaar & Christensen, PA

(57) ABSTRACT

An information device includes a dynamically configurable security module in which operational settings are automatically and dynamically configured based on risk profile or computing capacity information, or both.

20 Claims, 16 Drawing Sheets

U.S. PATENT DOCUMENTS

| | | | |
|---|---|---|---|
| 2005/0164675 A1 | 7/2005 | Tuulos et al. | |
| 2005/0191988 A1 | 9/2005 | Thornton et al. | |
| 2005/0240999 A1 | 10/2005 | Rubin et al. | |
| 2005/0246767 A1 | 11/2005 | Fazal et al. | |
| 2006/0005244 A1 | 1/2006 | Garbow et al. | |
| 2006/0015868 A1 | 1/2006 | Rechterman et al. | |
| 2006/0048218 A1 | 3/2006 | Lingafelt et al. | |
| 2006/0075218 A1* | 4/2006 | Barragy et al. | 713/100 |
| 2006/0112416 A1 | 5/2006 | Ohta et al. | |
| 2006/0112427 A1 | 5/2006 | Shahbazi | |
| 2006/0117177 A1 | 6/2006 | Buer | |
| 2006/0203815 A1 | 9/2006 | Couillard | |
| 2006/0218635 A1 | 9/2006 | Kramer et al. | |
| 2006/0224742 A1 | 10/2006 | Shahbazi | |
| 2007/0087761 A1 | 4/2007 | Anjum et al. | |
| 2007/0101430 A1 | 5/2007 | Raikar | |
| 2007/0143824 A1 | 6/2007 | Shahbazi | |
| 2007/0168721 A1 | 7/2007 | Luiro et al. | |
| 2007/0174610 A1 | 7/2007 | Furuya et al. | |
| 2007/0192867 A1 | 8/2007 | Miliefsky | |
| 2007/0294744 A1 | 12/2007 | Alessio et al. | |
| 2008/0022093 A1 | 1/2008 | Kurien et al. | |
| 2008/0040790 A1 | 2/2008 | Kuo | |
| 2008/0046713 A1* | 2/2008 | Barragy et al. | 713/100 |
| 2008/0046965 A1 | 2/2008 | Wright et al. | |
| 2008/0052395 A1 | 2/2008 | Wright et al. | |
| 2008/0066179 A1 | 3/2008 | Liu | |
| 2008/0077971 A1 | 3/2008 | Wright et al. | |
| 2008/0109679 A1 | 5/2008 | Wright et al. | |
| 2008/0155645 A1 | 6/2008 | Hutnik et al. | |
| 2008/0189788 A1 | 8/2008 | Bahl | |
| 2008/0222692 A1 | 9/2008 | Andersson et al. | |
| 2008/0256536 A1 | 10/2008 | Zhao et al. | |
| 2009/0119740 A1* | 5/2009 | Alperovitch et al. | 726/1 |

FOREIGN PATENT DOCUMENTS

| | | |
|---|---|---|
| WO | WO 2006/131124 | 12/2006 |
| WO | WO 2007/110094 | 10/2007 |

OTHER PUBLICATIONS

Office Action mailed Jul. 16, 2009 in U.S. Appl. No. 12/357,266, 8 Pgs.

* cited by examiner

| Name | Display | Processor | Drive | Battery | Communication |
|---|---|---|---|---|---|
| Asus EEE PC 900 | 8.9" | 900MHz Celeron | 8 Gb SSD | 4400-5200mAh, up to 3h 30min | Ethernet, 802.11 b/g |
| MSI Wind | 10" | 1.6 GHz Atom | 80-160 Gb SATA | 2200-5200mAh, 2.5-5.5 h | Ethernet, 802.11 b/g |
| HP 2133 Mini-Note PC | 8.9" | VIA C7 1.0-1.6 GHz | SSD, SATA | 4400-5200mAh, 2.5-4 h | Ethernet, 802.11 a/b/g |
| Dell Inspiron Mini 9 | 8.9" | 1.6 GHz Atom | 4-16 Gb SSD | 2200-3600mAh, up to 5h | Ethernet, 802.11 b/g |
| NanoBook | 7" | VIA C7 1.2 GHz | 30 Gb HDD | up to 4.5 h | Ethernet, 802.11 b/g |
| Sony Vaio UX Micro PC | 4.5" | Intel Core Solo 1.06-1.33 GHz | SSD, HDD | 1.5-7 h | 802.11 b/g |
| Samsung SCH-i730 | 2.8" | Intel PXA 520 MHz | SD | standby - up to 180-280 h | 802.11 b |

*FIG. 4D*

| Device | Performance rating |
|---|---|
| Device 1 | 1000 |
| Device 2 | 7000 |
| Device 5 | 32000 |
| Device 16 | 18000 |

*FIG. 4E*

| Performance rating | Configuration type |
|---|---|
| <1000 | Base (Management console, locations database, encryption tool) |
| 1000-10000 | Advanced (Added Antivirus, Firewall) |
| >10000 | All (Added Backup tool, Full base of intrusions description) |

*FIG. 4F*

ADAPTIVE SECURITY FOR INFORMATION DEVICES

PRIOR APPLICATION

This Application claims the benefit of U.S. Provisional Application Ser. No. 61/142,088, entitled "ADAPTIVE SECURITY FOR INFORMATION DEVICES," and having a filing date of Dec. 31, 2008.

FIELD OF THE INVENTION

The invention relates generally to information technology and, more particularly, to a security system and associated methods for protecting information devices.

BACKGROUND OF THE INVENTION

In today's world of personal information and communications systems, the prevalence of portable information devices is rapidly growing, particularly systems built on the netbook, or sub-notebook, platform, as well as multifunctional communication devices known as smartphones or personal digital assistants (PDAs), Ultra-Mobile Personal Computers, (UMPC), or Mobile Internet Devices (MIDs), utilizing processors such as Atom or Moorestown CPUs manufactured by Intel, or running operating systems such as Symbian OS, Windows Mobile, and the like. Networks offering open access to the public, such as EDGE and 3G, and various WiFi networks (such as those based on the IEEE 801-type standards), have become commonplace and continue to grow in popularity.

As communication systems and devices grow in complexity and communications bandwidth, with data rates approaching tens of megabytes per second, the risk of users inadvertently obtaining malicious programs and other unwanted content also grows. Additionally, the increasing popularity of portable information devices and open networks creates ever-increasing opportunities for malicious actors, such as hackers, identity thieves, spammers, and the like, to victimize users of these technologies. The quantity and severity of threats to computer systems, such as viruses, worms, malware, spyware, hacker attacks, as well as unwanted content, such as phishing attacks and other spam, continue to grow.

Firewalls, antivirus, antispam, and other such security applications geared toward personal computers are well-known. However, applying known approaches to portable information devices presents special challenges. Designers of portable information device systems and software have a principal objective of producing a device that provides timely access to information from practically any point in any city of the world. Portable information devices must be affordable in the highly-competitive, low-margin present-day market. Further, portable information devices must offer the utmost in portability and usability, meaning small overall device size and sufficiently long times of operation (at least on the order of 24 hours). Performance and usability are often countervailing objectives with affordability and portability, since batteries account for a large portion of the device's overall size, weight and cost. Performance and usability are even countervailing objectives with one another, since increased processor clock speeds and memory correspond to increased energy demands.

All these requirements make it impractical to simply continually increase the processor power and data storage capacity by substantial amounts to provide improved portable information device security while maintaining performance, usability, portability, and cost attributes. These constraints, in turn, place limitations on the design of applications that run on portable information devices, especially security applications, which can require significant processor resources and memory capacity.

Therefore, effective security measures are needed that are particularly suited to meeting the unique needs of portable information devices.

SUMMARY OF THE INVENTION

Aspects of the invention are generally directed to a dynamically configurable security arrangement for an information device in which operational settings are automatically and dynamically configured based on risk profile, computing capacity information, or both.

In one aspect, an information device has computer circuitry, including a processor operatively coupled to a data store, a user interface, including display and user input devices, wireless communications circuitry, and a power supply that provides power to the computer circuitry, user interface, and wireless communications circuitry. The power supply can include an on-board energy source of limited capacity such as a battery, for example. The computer circuitry includes a security arrangement that may include a configurable security module, a risk profiling module, and a computing capacity determining module. The configurable security module provides security-related functionality in the information device according to a configuration of operational settings. The risk profiling module re-assesses a current set of security risks to which the information device is exposed. The computing capacity determining module re-assesses a current state of computing capacity availability of the information device.

Further, a security configuration module automatically and dynamically configures the operational settings of the security module based on the current set of security risks from the risk profiling module and on the current state of computing capacity availability from the computing capacity determining module. The security configuration module includes a configuration determining module and a configuration setting module. The configuration determining module determines from among a set of security-related functionality a subset of more essential functionality for which the configuration of operational settings are to be configured in response to the current set of security risks from the risk profiling module. The configuration setting module sets the configuration of operational settings in response to the current state of computing capacity availability from the computing capacity determining module, such that a computational load on the computer circuitry attributable to operation of the configurable security module is reduced while the subset of more essential security-related functionality is provided, thereby facilitating usability of the information device while providing security protection for the information device corresponding to the current set of security risks determined by the risk profiling module.

A method for automatically configuring a security arrangement on an information device according to another related aspect of the invention, where the security arrangement is implemented by computing hardware or by a combination of computing hardware and software, includes automatically profiling, by a computing device, a current security risk level to which the portable information device is exposed. A computing device automatically re-assesses, from among a set of security functionality, a subset of more essential security functionality for which the security arrangement is to be configured to protect the information device in response to the profiling of the current security risk level. A computing device automatically re-assesses available computing capacity of the portable information device. The method further includes automatically and dynamically configuring, by a computing device, a security arrangement to run on the portable information device based on the profiling of the current security risk level and on a result of the determining of the computing capacity, such that a computational load on the information device attributable to operation of the configurable security module is reduced while the subset of more essential security functionality is provided, thereby facilitating usability of the information device while providing security protection for the information device corresponding to the current security risk level.

Some aspects of the invention are applicable to addressing challenges specific to portable information devices, such as those described above, as well as other challenges faced by designers of small, hand-portable devices in particular. Other aspects of the invention apply to information devices in general, without regard to the degree of portability of the devices, and without regard to whether the devices are primarily battery-powered or primarily line-powered. Thus, aspects of the invention can be applied to notebook and desktop computers, and to other products or equipment that utilize a security arrangement. For the sake of simplicity, embodiments of the invention described below are in the context of portable information devices. However, it will be understood that the various aspects of the invention can be realized and adapted to apply to other types of devices, systems, and equipment by selecting combinations of features that are suitable to the various types of products.

A number of advantages will become apparent from the following Detailed Description of the Preferred Embodiments.

BRIEF DESCRIPTION OF THE DRAWINGS

The invention may be more completely understood in consideration of the following detailed description of various embodiments of the invention in connection with the accompanying drawings, in which:

FIGS. 4D and 4E are tables illustrating example sets of data contained in a device information database that is part of a computing capacity determining module, according to various embodiments of the invention.

FIG. 4F is a table that represents an example set of determined PID configuration types according to one aspect of the invention.

Figure 1A:
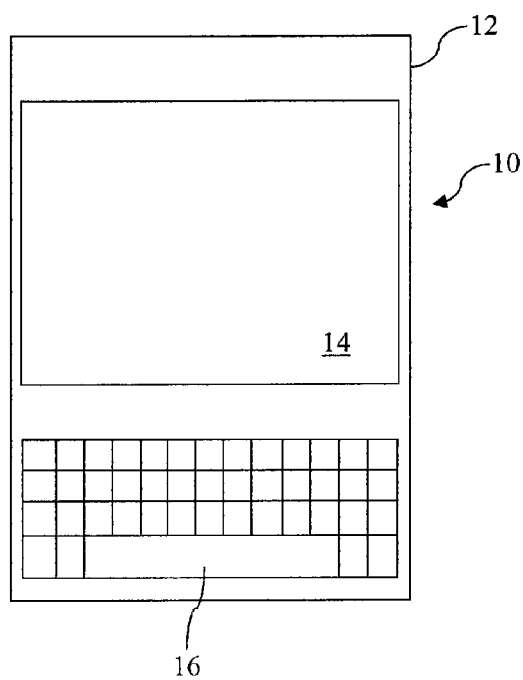
FIG. 1A is a block diagram illustrating major external components of a portable information device (PID) to which security arrangements according to aspects of the invention can be applied.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

FIG. 1A is a block diagram illustrating an exemplary portable information device (PID) 10. PID 10 can be a smartphone, PDA, UMPC, MID, or any other small, lightweight computing and communications device. PID 10 includes a compact housing 12 that is small enough to make the device easily portable, and a user interface that includes display 14 and a user input device, such as keyboard 16. PID 10 can have a touchscreen display in which the display and user input devices are integrated.

Figure 1B:
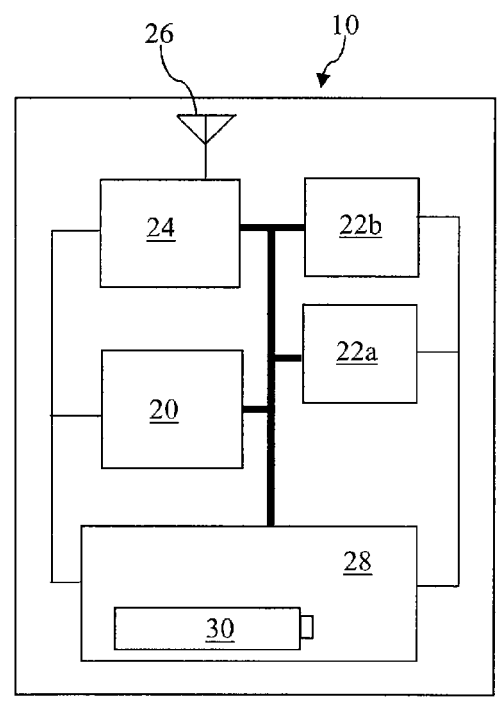
FIG. 1B is a block diagram illustrating major internal components of the PID of FIG. 1A.

FIG. 1B is a block diagram further illustrating additional functional components of PID 10. PID 10 further includes computer circuitry, such as processor 20 interfaced with a data store having RAM 22a and non-volatile memory 22b.

Processor 20 is also interfaced with wireless communications circuitry 24, which can take the form of a mobile telephone radio (CDMA, GSM, Iridium, or the like), Wi-Fi, Bluetooth, or any other such communications circuitry, coupled to an antenna 26. It will be understood that processor 20 is interfaced with the user interface devices, and with any other peripheral devices that may form a part of PID 10. PID 10 also includes power supply 28 with an on-board energy source 30 exemplified as illustrated in FIG. 1B in the form of a battery, enabling truly portable and mobile operation. Power supply 28 provides appropriate power to all of the components of PID 10 from energy source 30, and includes circuitry to enable external power to be supplied to operate PID 10 and to charge energy source 30.

Although today's practical devices tend to utilize certain technologies predominantly, such as CMOS-based microcontrollers, DRAM, Flash non-volatile memory, radio frequency devices for communications, batteries for energy storage, and the like, it should be understood that the invention is in no way limited to any particular set of technologies. Some aspects of the invention are directed to addressing challenges often experienced by small personal computing and communications devices, without regard to particular architectures or technologies, in which inherent trade-offs can exist between performance and user experience on the one hand, and energy demands, portability, and size, on the other hand.

When used as a data communications device, portable devices such as PID 10 typically links to a host network, which in turn provides connectivity over a wide area network such as the Internet. Host networks may be operated by cellular telephone service providers, as in the case with smartphone-type 3G devices. Other types of common host networks can include IEEE 802.11 Wi-Fi hotspots on local area networks (LANs) that are connected to the Internet via Internet Service Providers (ISPs). Portable devices can also connect with other devices to form a mesh network. Regardless of the type of arrangement of the host network, any arrangement in which a PID makes use of any service, such as Internet connectivity, for example, from another computing device, is a client-server arrangement where the PID is the client, and the computing device that provides the service is the server.

Figure 1C:
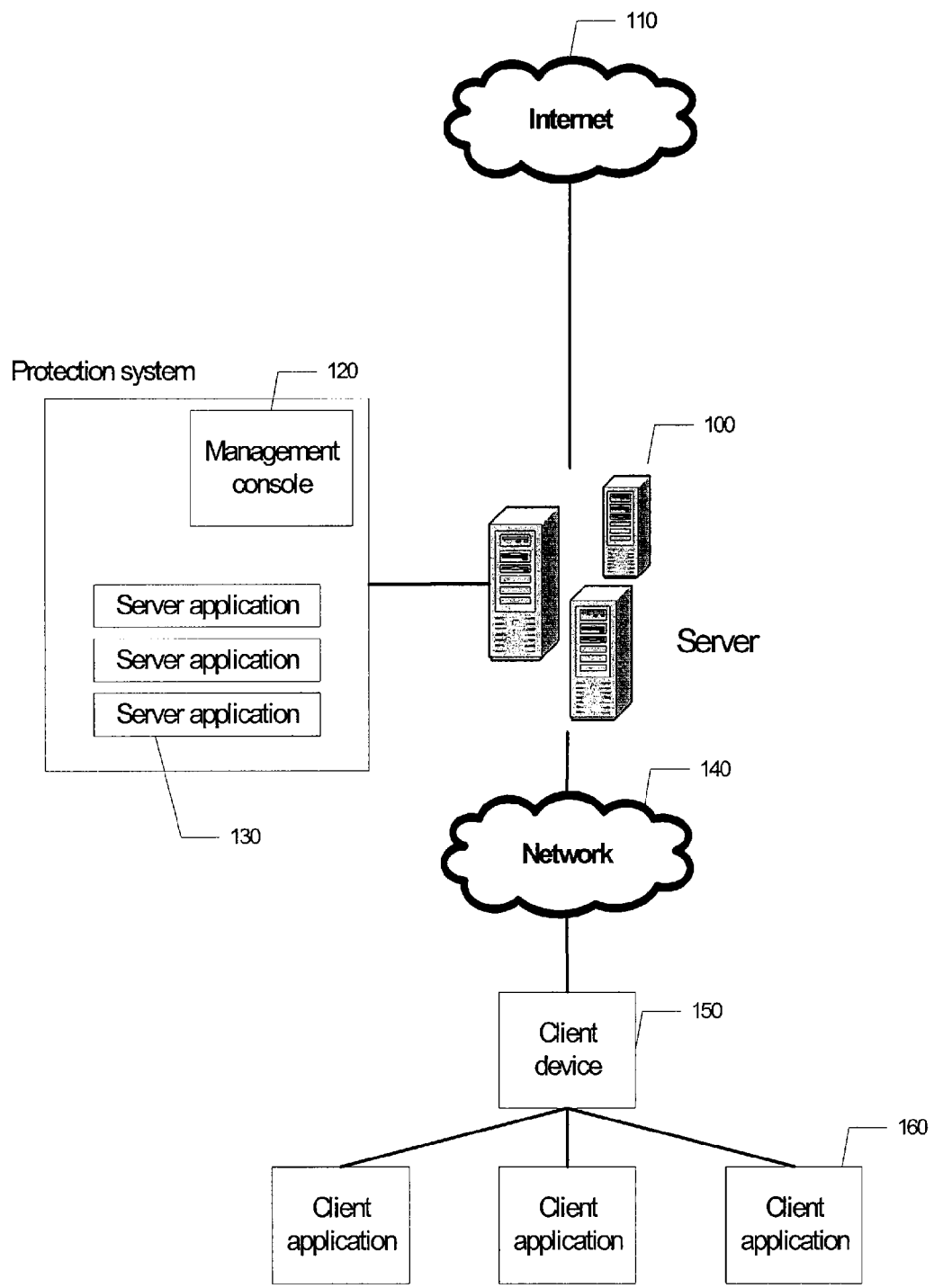
FIG. 1C illustrates a system architecture that includes security provisions that protect a client device from various threats.

FIG. 1C illustrates a system architecture that includes security provisions that protect client device 150 from various threats. Server 100 controls traffic that travels to network 140 from outside network 110, such as the Internet. Client device 150 represents any of a variety of PIDs. Client device 150 runs various applications 160. Server 100 runs various applications 130, which support or facilitate the operation of client applications 160. One example of an application 130 is a Web server application. In addition to server applications that support or facilitate the primary functions of the client applications, the server has applications for security. Management console 120 provides administrator access for controlling server applications 160, and for changing different application settings. Management console 120 has its own graphical user interface (GUI), which allows for the administrator of the server to make adjustments to the server applications 160 in real time. With the provision of console 120, the administrator can control both, the applications for security, and other various applications, which operate on the server.

Figure 1D:
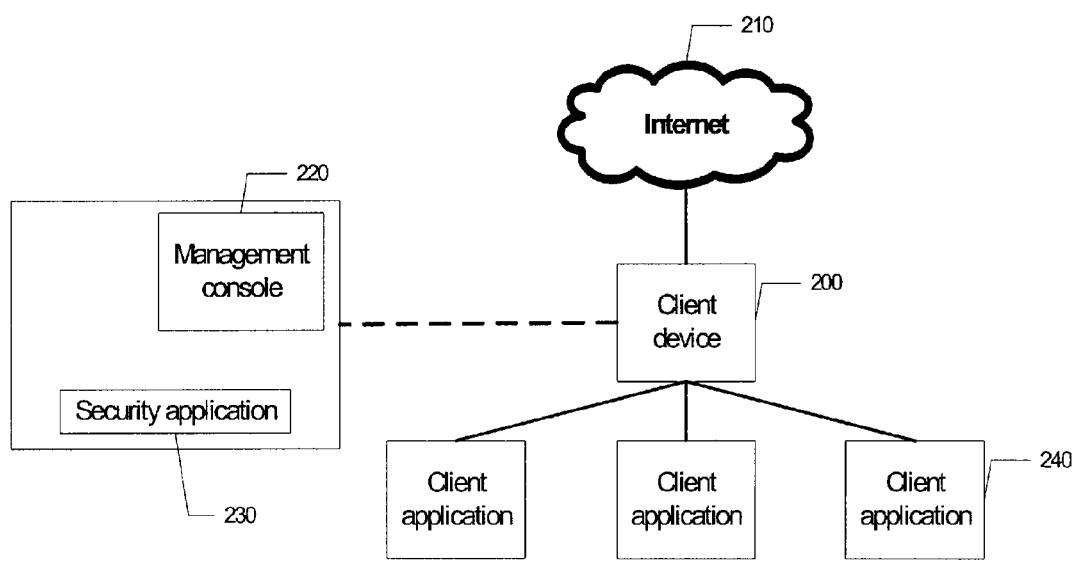
FIG. 1D is a schematic diagram of an operational arrangement of a client device, which is used by a user in unprotected network.

FIG. 1D is a schematic diagram of an operational arrangement of a client device 200, which is used by a user in unprotected network 210. Client device 200 runs various client applications 240. Such an arrangement can exist when the user of client device 200 attempts to access the Internet at cafes, hotels, airports, or other public places, or attempts to load software updates, while located in such places.

Conventionally, client device 200 would need to be supplied with its own security application 230. Utilizing management console 220, the user of client device 200 can adjust the settings of security application 230 to set a level of protection based on user-perceived needs. For instance, the user may deem it appropriate to increase the aggressiveness of an antivirus scanning program that is a part of security application 230, when the user is connected to the Internet via a public network. This arrangement is an example of a thick client security application that runs locally on client device 230 to provide protection for client applications 240.

One challenge faced by such an arrangement is the thick client security application 230 can be limited by insufficient system resources needed to run client applications 240. Similarly, client applications 240 can be limited by the drain of computing resources needed to run security application 230. Even with sufficient computing resources, the drain on the battery from the intensive processing of both, the security application 230, and client applications 240, can dramatically reduce the mobility and usability of the portable information device between charges. For these, and other reasons, a conventional thick client security arrangement is not a fully-capable substitute for a global security arrangement such as the one described above with reference to FIG. 1C.

Figure 1E:
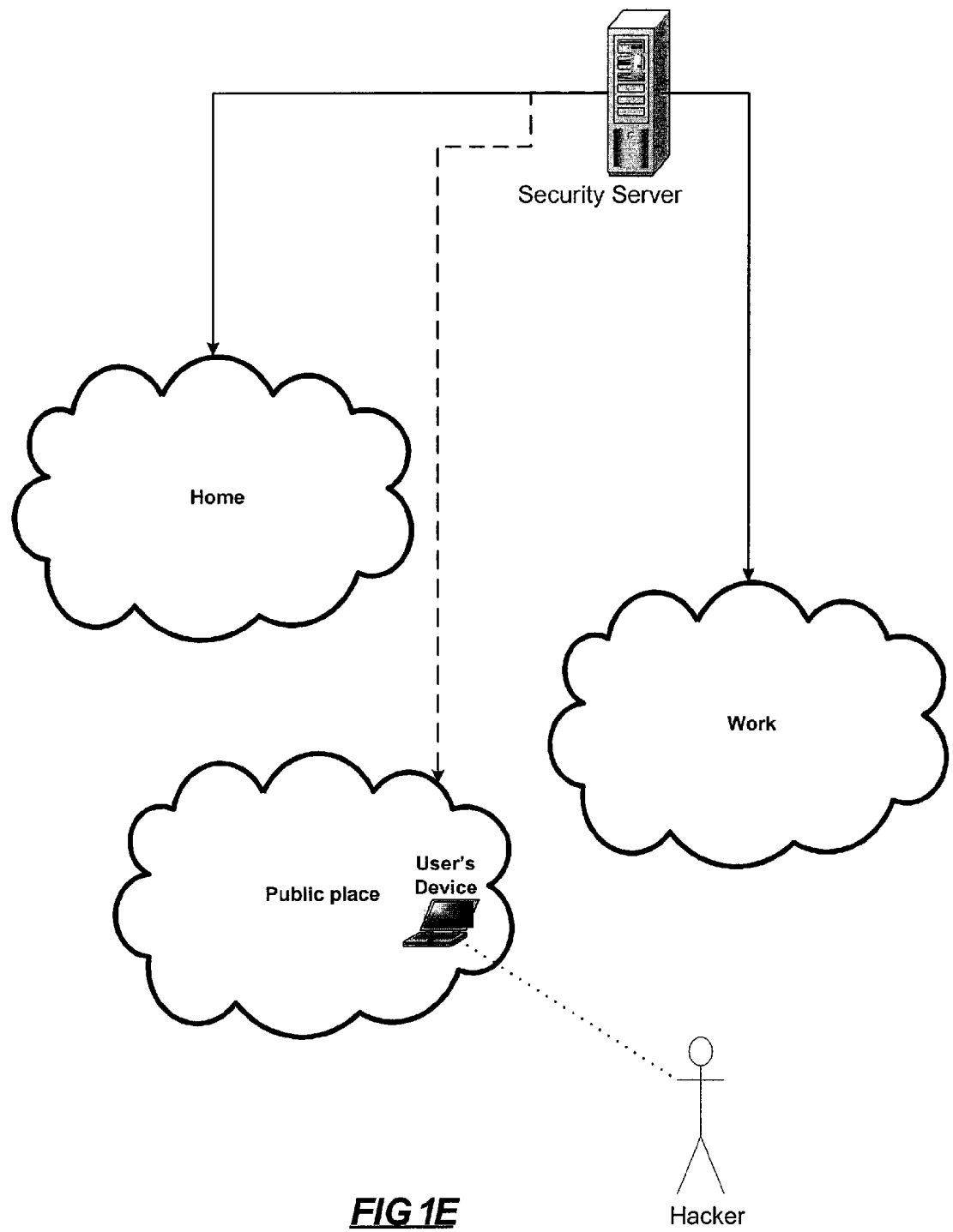
FIG. 1E is a diagram illustrating a common risk scenario in which the user of the client device cannot be confident in the overall protection of its data.

FIG. 1E is a diagram illustrating a scenario in which the user of the client device cannot be confident in the overall protection of its data. While the user may be confident that the home and work networks have the benefit of a security server, such as a firewall at the host network, a the user cannot have the same confidence in other places, where the user's device can be subjected hacker attacks or unknown programs that might defeat any non-robust local firewall or other security measures on the user's device.

Figure 2A:
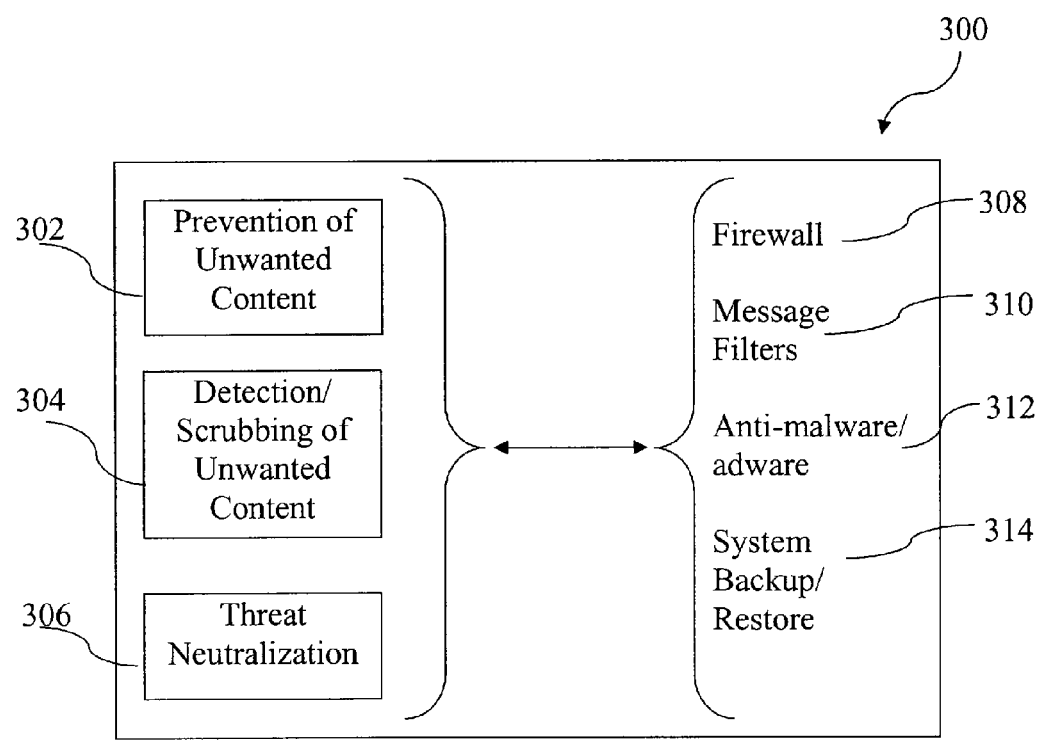
FIG. 2A is a diagram of a local security module that runs on a portable information device according to one aspect of the invention.

FIG. 2A is a diagram of a local security module 300 that runs on a portable information device according to one aspect of the invention. The term "module" as used herein means a real-world device or component implemented using hardware, such as by an application specific integrated circuit (ASIC) of field-programmable gate array (FPGA), for example, or as a combination of hardware and software, such as by a microprocessor system and a set of instructions to implement the security module functionality. A module can also be implemented as a combination of the two, with certain functions facilitated by hardware, and other functions facilitated by a combination of hardware and software. In certain implementations, at least a portion, and in some cases, all, of a module can be executed on the processor of the PID that executes application programs, such as processor 20 of PID 10. Accordingly, security module 300 can be realized in a variety of configurations, and should not be limited to any particular implementation exemplified herein.

Security module 300 performs any combination of one or more security-related functions, such as prevention of unwanted content 302, detection/scrubbing of unwanted content 304, and threat neutralization 306. These security-related functions are described below only generally, by way of illustration, and are not intended to be a required or exhaustive list of security functions within the spirit of the invention as it applies to security module 300. A variety of other security-related functions can be present in addition to, or in place of, any of the functions exemplified herein.

Prevention of unwanted content 302 includes blocking unwanted content, such as viruses, worms, and other malware, adware, spyware, spam, and the like, as well as undesired data traffic, such as hacker attacks, before any of these threats or programs can be placed on the local device. Typically, this function involves blocking or diverting of content or data traffic at a firewall. Detection/scrubbing of unwanted content 304 would apply to content that may have penetrated the prevention function, and now resides in some form on the local device. A typical example of this functionality would include scanning for viruses based on a database of virus definitions, and removing or quarantining those program instructions or associated data. Threat neutralization 306 applies to detected unwanted content or detected attacks or threats in progress, and involves taking action to terminate any suspect programs or processes, stop network traffic, and restore the system to a previous known safe state.

Security module 300 includes a variety of components, such as, for example, firewall 308, message filters 310, anti-malware/adware blocking/removal tool 312, and system backup/restore utility 314. These components can work in different combinations to achieve the various functions of security module 300.

In one embodiment, security module 300 facilitates configurability of its functions. For example, one type of configurability is the ability to selectively turn individual components or functions on or off. Another type of configurability is the ability to dynamically adjust the operation of individual functions or components. For example, operational settings of firewall 308 can be adjusted in one embodiment to set a level of protection to be more or less aggressive, based on the needs of the operator or of the system.

In another example, anti-malware/adware component 312 is adjustable. Anti-malware/adware component 312 has a database of known threat definitions, which it uses to scan the data store for the presence of any known threats. In one embodiment, the threat definitions database can be limited or expanded with additional threat definitions, based on the system or user needs.

In related embodiments, various other operational settings of security module 300 can be adjusted automatically, i.e., without user intervention. Aspects of the invention recognize that different operational settings of a variety of different security functions or components can be adjusted, without limitation to the examples described herein.

Figure 2B:
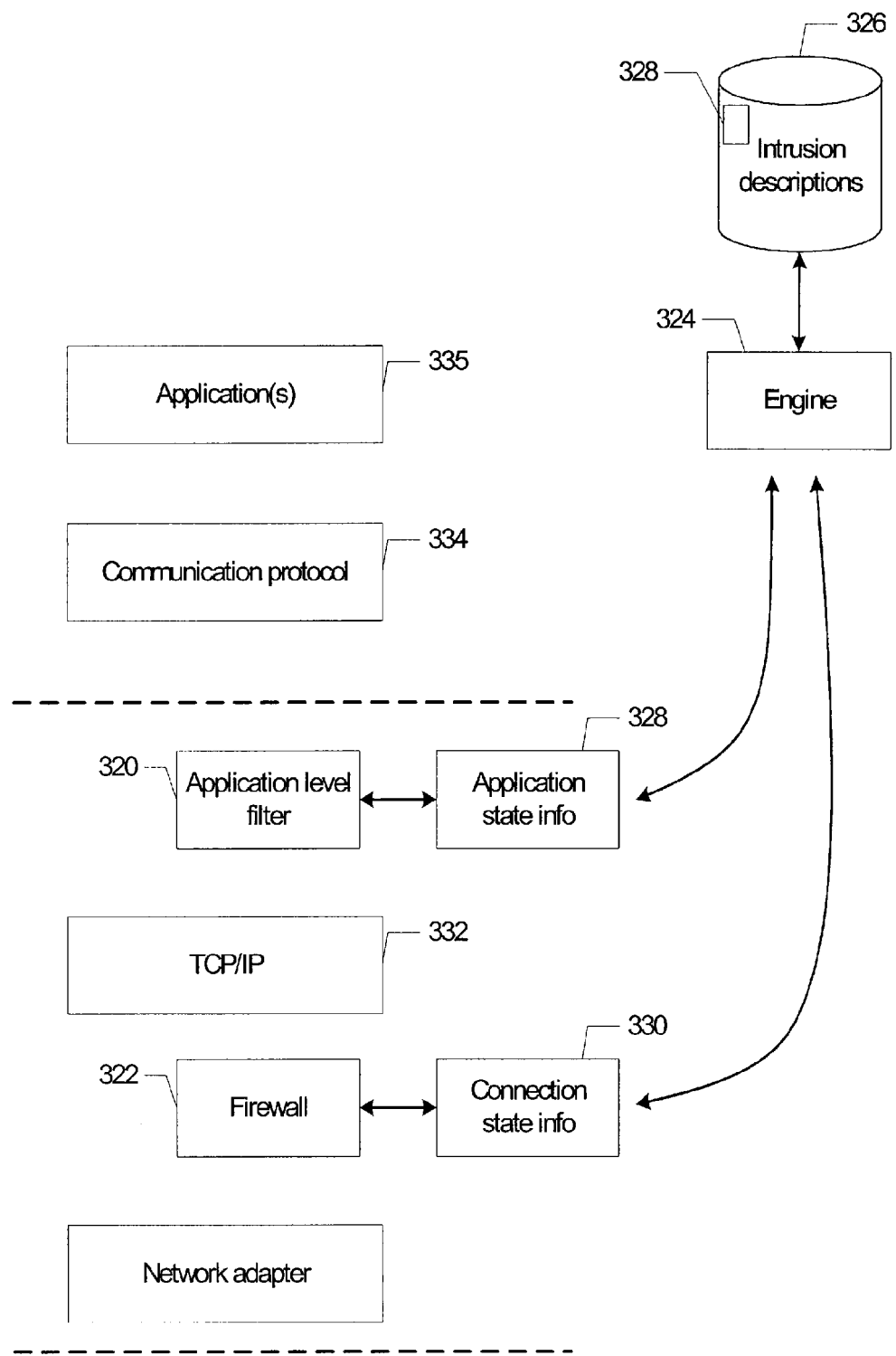
FIG. 2B is a diagram depicting a security module according to one aspect of the invention that includes application-level protection, in which the configuration can be adjusted based on the application programs of the PID.

FIG. 2B depicts a security module including application-level protection according to one embodiment, in which the configuration can be adjusted based on the application programs of the PID. Application level filters 320 and firewall 322 obtain information about the local system's operation from the various OSI model layers. Engine 324 which, with the aid of intrusion description database of 326, operates to isolate known threats or attacks and analyzes incoming traffic. In one embodiment of intrusion description database 326, the descriptions of threats are represented in XML format. Each threat description 328 can include various items of information such as, for example, the type of application, its version, registry entries associated with the application, the vulnerable port, etc. For each threat description, the various items of information are utilized to establish special rules for monitoring and filtering incoming network traffic. Being threat-specific, the rules can be tuned for dealing with certain types of attacks or for specialized applications.

Engine 324 is communicatively coupled with two information channels: application state information 328, and connection state information 330, which in turn are respectively coupled with application level filter 320, and firewall 322. Each time a network connection is established, or whenever an application 335 begins to use a particular port, engine 324 determines, based on the contents of database 326, whether there is any significant likelihood that any known threats are present. Any threats identified in this manner would constitute a relatively small, but more highly relevant, subset of the available known threats. This small subset can thus be practically analyzed and tracked.

In operation, firewall 322 intercepts only a small portion of the total data traffic, since connection state information 330 primarily includes communication protocol and related information such as Internet Control Message Protocol (ICMP) commands. Still, a large portion of potential threats requires a more thorough analysis and more detailed information about the threats and their impact on their targeted computer system. Accordingly, information obtained only through analysis of the TCP/IP protocol is insufficient to provide a robust level of protection.

At the application level, the specialized filter 320 makes it possible to concentrate threat analysis on the specific set of vulnerabilities that are known for each application 335. Application level filter 320 intercepts the traffic between the TCP/IP service 332 and communication protocol layer 334. The intercepted traffic is analyzed by engine 324 separately for each application. In one embodiment, the security system identifies active applications (e.g., MS Outlook Mobile). In a related embodiment, the system determines the types of active applications (e.g., Web browser, games, etc.) based on the port(s) being utilized and the types of data communications protocols are being used. Thus, the system obtains knowledge of either the specific active applications or the types of applications in use. With this information, the system selects appropriate protection schemes that are tailored to the present applications or activities. Thus, the system concentrates security resources on only the relatively small group of rules and the description of threats 326 associated with the exposure of the particular applications currently running.

Figure 2C:
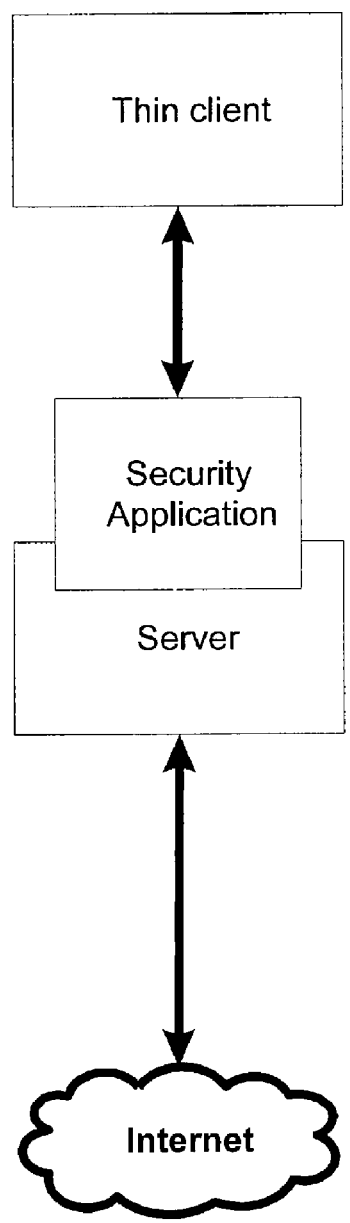
FIGS. 2C and 2D one type of configurability of security arrangements according to embodiments of the invention, in which thin client and thick client configurations can be dynamically configured based on a variety of factors related to the configuration or operating state of the PID.
Figure 2D:
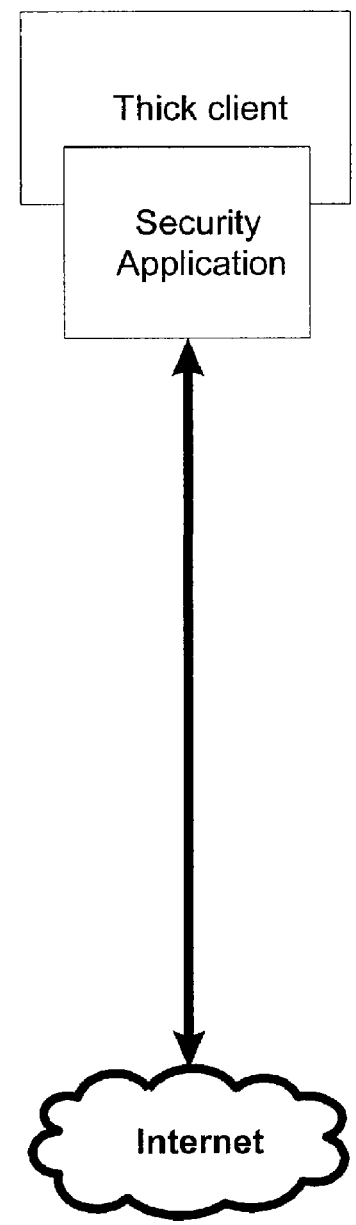

FIGS. 2C and 2D illustrate another type of configurability of security arrangements according to embodiments of the invention. The thin client and thick client configurations shown respectively in FIG. 2C and FIG. 2D can be dynamically configured based on a variety of factors related to the configuration or operating state of PID 10, as will be described in more detail below. The dynamic configurability provided by these embodiments enables an adequate level of security to be maintained while permitting better computing performance, or better mobility, or both, of the user's device. Accordingly, the user can remain confident that a suitable security configuration will exist notwithstanding where the user may be connecting to the network. If the user's device is located in a particular local area network known to be secure, the configuration of FIG. 2C is selected, in which the security application existing on the local network's server is relied upon. In this case, the user's device will adopt a thin-client security configuration in order to off-load the security-related computing load entirely upon the server. In this thin-client configuration, the user's device has more computing resources available for running ordinary (non-security) applications, thereby achieving better performance and energy economy.

If, on the other hand, the user's device has been determined to be connected to the Internet through a local area network that is not known to have adequate security, the configuration of FIG. 2D is selected. The arrangement of FIG. 2D has the security application running locally on the user's device in a thick client configuration. Although the user's device will have reduced computing performance for non-security applications, the thick client security arrangement of FIG. 2D will provide adequate security in the absence of a protected network.

In related embodiments, a hybrid thin client/thick client security arrangement can be configured, in which certain security functions are off-loaded to the server, while other security functions are executed locally on the user's portable information device. For example, in one such hybrid configuration, PID 10 runs a reduced-function firewall that controls network traffic to of outbound data and blocks all unauthorized inbound traffic, but does not take on the burden of scanning authorized inbound traffic for potentially harmful data payloads. In this hybrid configuration example, a security server takes on the computing-intensive remaining firewall functionality of scanning data communications for potential threats, and responding to those threats.

Figure 2E:
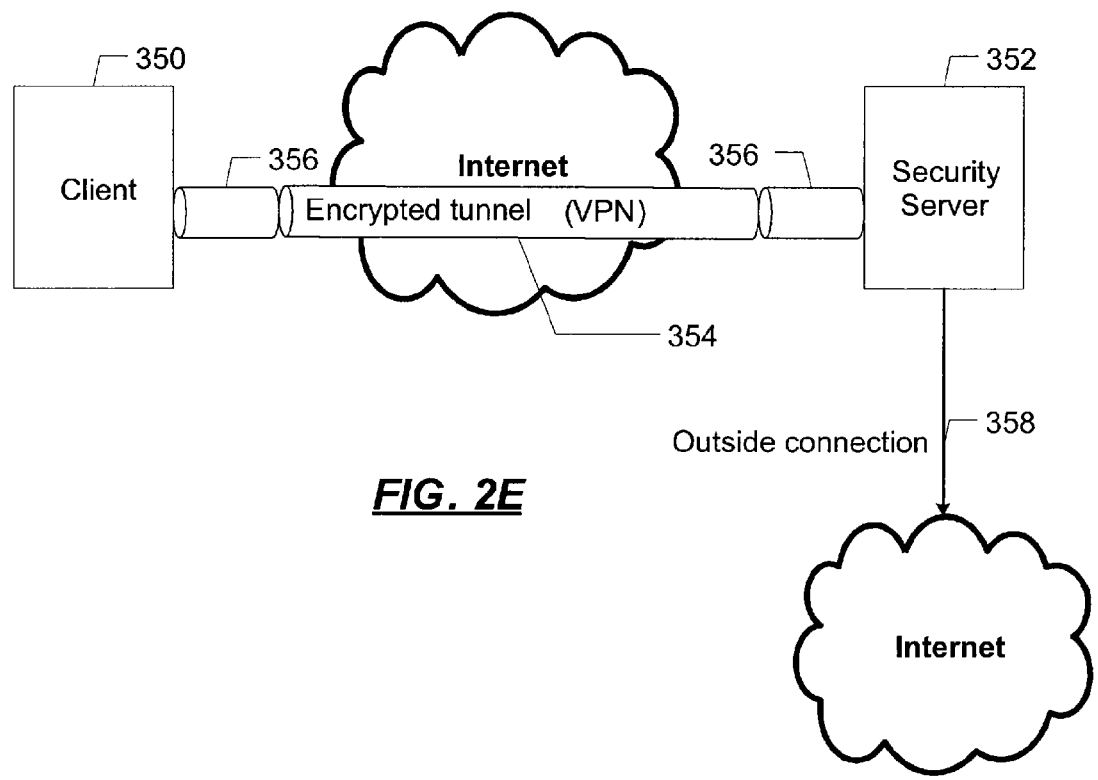
FIG. 2E illustrates a communication channel according to one embodiment of the invention that facilitates operating a thin-client or a hybrid security arrangement in which a majority of security-related functions are carried out by a remote security server.

FIG. 2E illustrates a communication channel according to one embodiment that facilitates operating a thin-client or a hybrid security arrangement in which a majority of security-related functions are carried out by a remote security server. This arrangement can be used in cases where the user of client device 350 is located remotely from security server 352, but wishes to utilize its resources. Likewise, the arrangement can be utilized where the user of client device 350 requests or requires the use of a remote security system, in which case protected network 352 would perform various security functions for the benefit of client device 350. In this aspect of the invention, a secure connection with security server 352 includes virtual private network (VPN) connection 354, and an additional encrypted connection 356, into which is embedded VPN connection 354. In one type of embodiment, encryption is achieved on the basis of a known client identifier, such as, for example, personal data of a user, or unique hardware parameters. The various parameters upon which the encryption is based can be created in advance by the user, i.e., prior to the time when the user wishes to use the secure connection. After establishment of the secure connection between client device 350 and security server 352, the user of client device 350 can safely access the resources of security server 352, or its outside connection 358. Outside connection 358 can be an Internet connection, or a connection to some other normally unsecured network that is made secure with the protective software running on security server 352. In a related embodiment, encrypted connection 356 monitors the integrity of VPN connection 354, and takes steps to restore the connection in case the monitoring detects an unplanned termination of the connection for any reason.

Another aspect of the invention is directed to implementing decision criteria for when, and how, to automatically configure the security arrangement for PIDs. Configuration can be set locally, such as by a configuring process running on PID 10. Alternatively, configuration can be set remotely, such as by a remote security server. In one embodiment in which configuration is set locally, a security configuration module running locally on PID 10 is tasked with determining when to configure or re-configure the security module, and what operational settings to establish. The security configuration module can receive, monitor, or otherwise obtain information about the system configuration, the operating state of PID 10, relevant history of PID 10, global security situational information, user preferences, or any combination of these. In turn, this information would be used in the automatic configuring of the security module. System configuration data can include, device type, processor speed, memory size, processor bus speed, battery capacity, a list of installed applications, and a list of frequently-used applications.

In an embodiment where configuration of the security module is done remotely, PID 10 establishes a connection with a remote security server, and transmits system configuration, operating state, relevant history, global security situational information, user preferences data, etc., to the server. The server receives and analyzes the transmitted data, and issues a command back to PID 10 to adjust the configuration settings of the security module.

Operating state data can include items such as the physical location of PID 10, network traffic speed, network traffic volume, remaining battery capacity, amount of memory allocated, a list of applications currently running, or processor idling time. Relevant history of PID 10 includes items such as recent history of detected attacks, higher-than-normal frequency of pings or attempted connections from unknown sources, and the like. Such items can be correlated to location information. Global security situational information can include items such as a current overall state of threats that exists. For instance, a prevalence of a particular worm, patterns of server outages attributable to denial-of-service attacks, and the like, would tend to increase the overall threat level. This type of information is constantly monitored by security firms, and can be provided to PID 10 during a security update, for example. User preferences can include items such as a risk tolerance input provided by a user, or performance requirements.

Figure 3A:
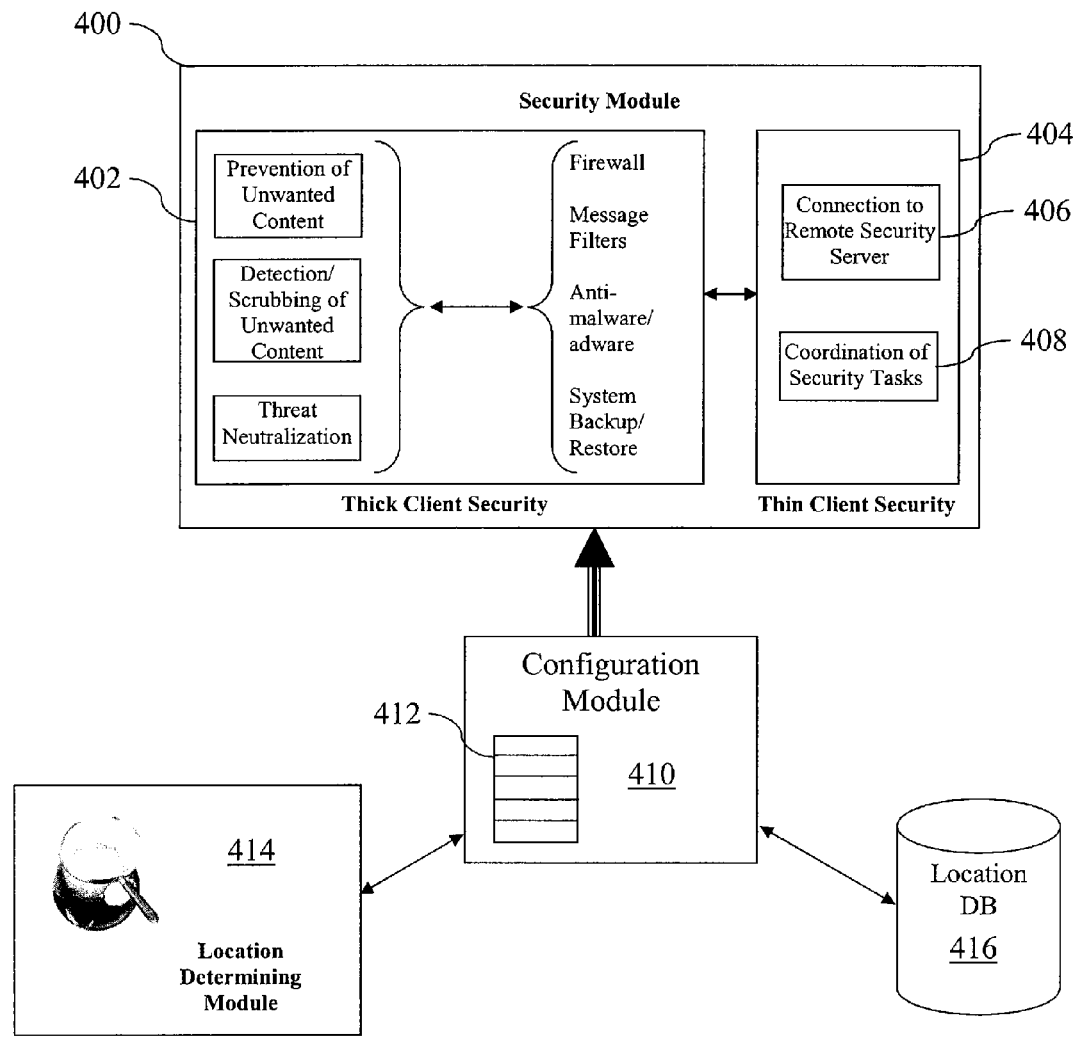
FIG. 3A is a block diagram illustrating a security arrangement according to one embodiment of the invention in which a configurable security module existing on a PID can be automatically configured based on a present location of the PID.

FIG. 3A illustrates a security arrangement according to one embodiment in which configurable security module 400 existing on PID 10 can be automatically configured based on a present location of PID 10. Security module 400 includes a thick client security portion 402, and a thin client security portion 404. Thick client security portion 402 is similar to security module 300 described above in that it can include a variety of security functions and components, each of which can be individually configured or adjusted. Thin client security portion 404 includes a provision 406 facilitating a connection to a remote security server, which includes a module configured with network addresses of various available security servers that implements logic for connecting to, and utilizing, any one of the remote security servers. One type of embodiment utilizes an encrypted tunnel connection such as the one described above with reference to FIG. 2E. Thin client security portion 404 also includes a task coordinating provision 408 that facilitates the exchange of information between thick client security portion 402 and the remote security server. The role of task coordinating portion 408 also includes ensuring proper overall operation when a hybrid security arrangement is in place in which portions of thick client security portion 402 operate in conjunction with the remote security server via thin client security portion 404.

The security arrangement of FIG. 3A further includes security configuration module 410, which interfaces with security module 400 and establishes or adjusts the security module's configuration and operational settings based on various inputs and on decision criteria 412. One type of input is the present location of PID 10, provided by location determining module 414. Location determining module 414 determines, or simply estimates, in real-time, where PID 10 is situated, or which local network PID 10 might be utilizing in order to connect to the Internet. In one such embodiment, location determining module 414 includes a global positioning system (GPS) receiver to determine physical location. In a related embodiment, location determining module 414 utilizes a network topology analyzer that analyzes data packets in order to deduce the location or network identity of the local network through which PID 10 may be communicating. The nature of location information provided by either method is different, so the two methods may be used in conjunction with one another to produce a better estimation of the location or network being used. In another related embodiment, location determining module 414 includes a user interface component that permits a user of the device to enter his or her location. The user interface input may be used in conjunction with either the GPS location or the network topology determination in order to fine-tune the location or network identity. For instance, the user may be presented with two or three possible choices from which to select the network being used, those choices having been automatically generated based on information deduced by the other location determining methods.

The position of the client device can be ascertained in various ways within the spirit and scope of aspects of the invention. A number of other techniques for determining the geographic position of a networked device are generally known, and any suitable technique can be utilized.

Security configuration module 410 uses the location identification to ascertain a security risk profile for the present location. Based on the security risk profile, configuration module 410 uses decision criteria 412 to set a suitable configuration for security module 400. Security configuration module accesses location profile database 416 to look up the present location from among a list of local networks at different geographic locations.

Figure 3B:
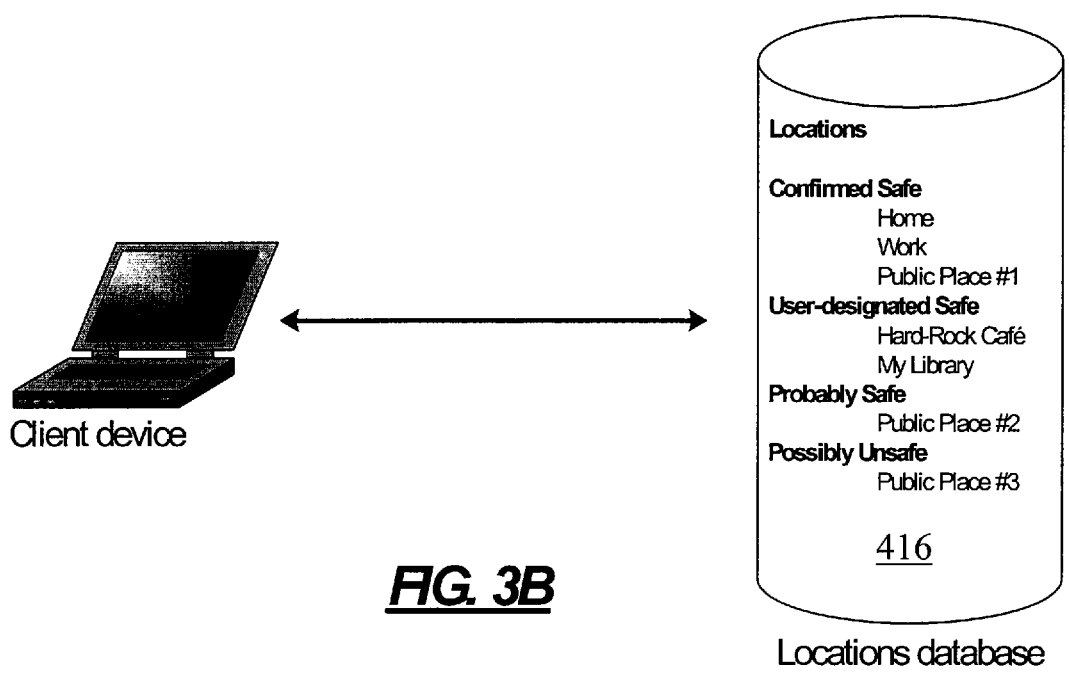
FIG. 3B illustrates an example of a location profile database according to one embodiment for use with the security arrangement of FIG. 3A, the database containing records of various places, or geographic locations, that are identified according to their degree of relative safety or danger in terms of security or threat level.

FIG. 3B illustrates an example of location profile database 416 containing records of various places, or geographic locations, that are identified according to their degree of relative safety or danger in terms of security or threat level. For example, certain places that are known to have good network security in place on the servers (such as in the arrangement of FIG. 1A), may be identified as having a "safe" status insofar as a user would be concerned. In one embodiment, the database contains records of places throughout the world. A user copy of the database can be maintained on PID 410, with automatic updates available whenever the client device is in communications with a security system server, which maintains a master (up-to-date) version of the database. Alternatively, security configuration module 410 can access a remote security server to query the location profile database 416. Places stored in the database can be categorized as shown in the embodiment of FIG. 3B: confirmed safe; user-designated safe; probably safe; and possibly unsafe. In another embodiment, combinations of different techniques for determining location of PID 10 may be utilized to confirm a "safe" status and counter attempts at location spoofing and the like. Various other categorizations or designations of safety level may be utilized.

In a related embodiment, the system supports defining conditions under which the safety status may depend. Accordingly, users can make their own assessment of safety based on their observations and on information contained in the database. In another related embodiment, the client device is configured to refresh its database of locations after connecting with the nearest security server running a security application according to embodiments of the invention.

Figure 4A:
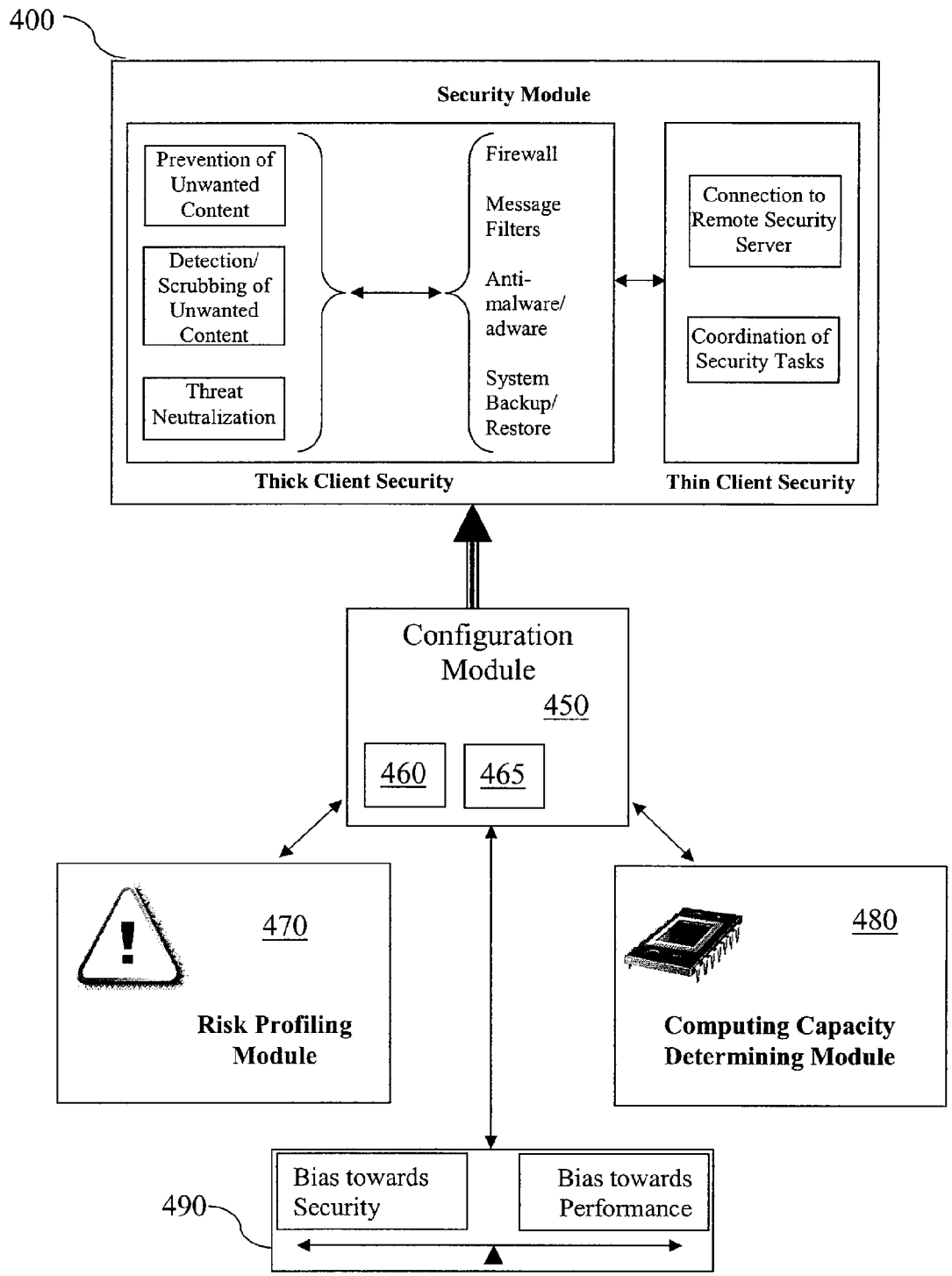
FIG. 4A is a diagram illustrating a security arrangement according to one type of embodiment in which the security module can be automatically configured based on a present security profile for the PID, on the present computing capacity of the PID, or both.

FIG. 4A illustrates a security arrangement according to one type of embodiment in which the security module can be automatically configured based on a present security profile for PID 10, on the present computing capacity of PID 10, or both. The arrangement includes configurable security module 400, described above with reference to FIG. 3A, which can be configured for thin or thick client, or hybrid, modes, and which can have various security functions or components selectively enabled or disabled, or have various operational settings adjusted dynamically. Configuration or adjustment of security module 400 is performed by security configuration module 450, which can be locally present in PID 10 together with security module 400, or which can exist remotely from PID 10 and access security module over a network.

Security configuration module 450 includes configuration determining module 460 and configuration setting module 465. Configuration determining module 460 includes decision criteria that read and process input from at least one of risk profiling module 470, computing capacity determining module 480, and user input module 490, to determine which configuration or operational settings are suitable to be set for security module 400. Configuration setting module 465, in turn, sets the determined configuration or operational settings in security module 400.

In one embodiment, configuration determining module 460 and configuration setting module 465 of security configuration module 450 configure the operational settings of security module 400 with a goal of reducing computational load on the computer circuitry presented by operation of configurable security module 400, while maintaining a level of security to protect against present security risks, as determined by the security configuration module based on the input from risk profiling module 470.

In one such approach, configuration determining module 460 maintains a hierarchy of security-related functionality available in security module 400. The hierarchy of security-related functionality is ordered according to a current set of security risks, as determined by risk profiling module 470. Thus, in this embodiment, the hierarchical arrangement is dynamic; whereas in more basic embodiments, static hierarchical arrangements of security-related functionality can be used. The hierarchy is ordered in terms of essentiality of functionality needed to protect against the current set of security risks. For example, for PID 10 running a web browser program but not an email client program, firewall and anti-malware/adware functions are more essential to maintaining protection from likely security threats than, for example, message filtering functions.

In a related embodiment, essentiality of functionality is ranked in terms of finer granularity, where operational settings for each class of security-related functionality can be varied. For example, the anti-malware/adware function can be tuned to protect against particular threats associated with applications that are currently being executed in PID 10, to the exclusion of providing a broader spectrum of protection against all known threats.

In one embodiment, configuration determining module 460 derives or selects the hierarchical order of security-related functionality in response to the current set of security risks from risk profiling module 470, and further selects, from among the hierarchy, a subset of more essential functionality based on the current computing capacity, as determined by computing capacity module 480. Thus, with greater available computing capacity, more security functionality is generally provided; however, under conditions of reduced computing capacity, security is limited to only essential features. Accordingly, security is limited intelligently and dynamically based on the circumstances, resulting in configuration setting module 465 setting the configuration of operational settings for security module 400, such that a computational load on the computer circuitry attributable to operation of security module 400 is reduced while the subset of more essential security-related functionality is provided, thereby facilitating usability of PID 10 while providing security protection for PID 10 corresponding to the current set of security risks.

In a related example, as computing capacity progressively becomes reduced, as would be the case when the battery of PID 10 becomes drained with use, configuration setting module 465 progressively disables security-related functionality in order of less essential functionality to more essential functionality to preserve computing capacity for non-security functions of PID 10.

Figure 4B:
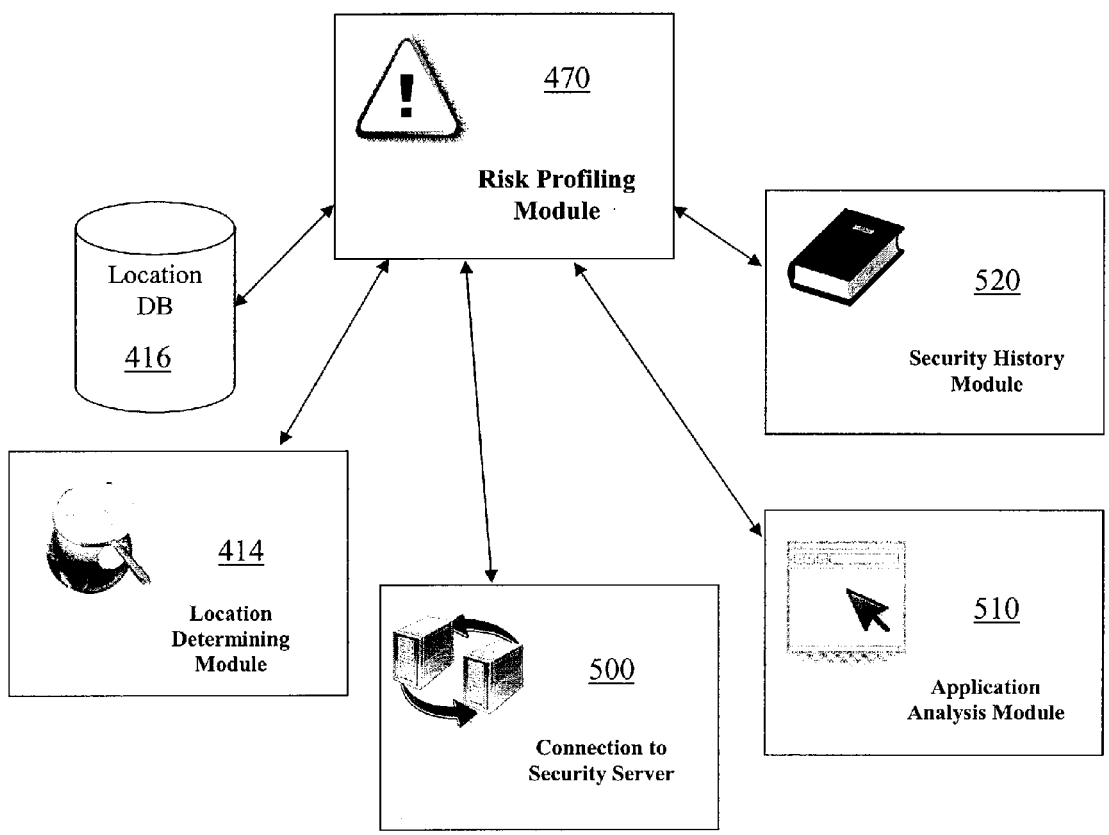
FIG. 4B illustrates an example arrangement of a risk profiling module of the security arrangement of FIG. 4A, according to one embodiment.

Risk profiling module 470, in various embodiments, obtains information from which it ascertains a present risk profile. FIG. 4B illustrates an example in which risk profiling module 470 interfaces with several different sources of risk-related information. In the example shown, risk profiling module 470 communicates with location determining module 414 and location database 416 (both of which have been described above) to obtain information about the present location and determine the corresponding level of security associated with the present location. Risk profiling module 470 in this example also interfaces with security server connection module 500, which enables risk profiling module 470 to obtain security-related information over the network. Examples of such information include information about the general threat level and, when used in conjunction with location determining module 414, the threat level specific to the present location.

Risk profiling module 470 assesses, and re-assesses a current set of security risks to which PID 10 is exposed. In one arrangement, risk profiling module 470 performs re-assessment periodically, such as on a certain predetermined time interval. In another arrangement, the re-assessment is performed in response to occurrence of certain events relevant to risk profiling, such as upon the opening of a new application instance, for example. In a related embodiment, re-assessment is performed both, periodically, and in response to events. In this type of embodiment, certain indicia of risk are re-assessed periodically, such as a present threat level indication, which does not tend to change frequently; while other indicia of security risk, such as network traffic volume, for instance, tends to change abruptly based on changes in operating modes or applications running on PID 10.

Application analysis module 510, in one embodiment, examines the registry of the operating system of PID 10 to determine which applications are installed on the device. From this information, risk profiling module 470, in conjunction with application analysis module 510, can determine specific vulnerabilities of PID 10. An application such as a Web browser would have a different vulnerability profile than an email application, or a spreadsheet, for example. In a related embodiment, application analysis module 510 examines applications that are presently active, which is a narrower subset than all of the installed applications. Accordingly, in one embodiment, the risk profile indication can vary as a function of time, depending on which applications are in use at the present instant.

Security history module 520 provides information about recent security-related occurrences that may reflect a present threat level. For example, if the firewall has been detecting a higher-than-normal frequency of attempts to access PID 10 by unknown devices, this may be an indicator of an increased risk of intrusion. Event history can also be associated with location information, such that different locations may have different relevant histories. Accordingly, if the user carries PID 10 to a new location, the relevant history for that location would be examined.

Referring again to FIG. 4A, computing capacity determining module 480 provides information about the system performance of PID 10 for use by security configuration module 450. This type of information enables security configuration module 450 to select an appropriate configuration for configurable security module 400 so that system performance is not unduly burdened by operation of the security system. In one type of embodiment, computing capacity information provided by computing capacity determining module 480 is considered in conjunction with the risk profile information by security configuration module 450 to achieve a proper balance between performance needs and security needs for PID 10.

Computing capacity determining module 480 assesses, and re-assesses a current state of computing capacity availability of PID 10. In one arrangement, computing capacity determining module 480 performs re-assessment periodically, such as on a certain predetermined time interval. In another arrangement, the re-assessment is performed in response to occurrence of certain events relevant to computing capacity, such as upon the opening of a new application instance, for example. In a related embodiment, re-assessment is performed both, periodically, and in response to events. In this type of embodiment, certain indicia of computing capacity are re-assessed periodically, such as battery capacity, which does not tend to change abruptly; while other indicia of computing capacity, such as available memory, for instance, tends to change abruptly based on changes in operating modes or applications running on PID 10.

Figure 4C:
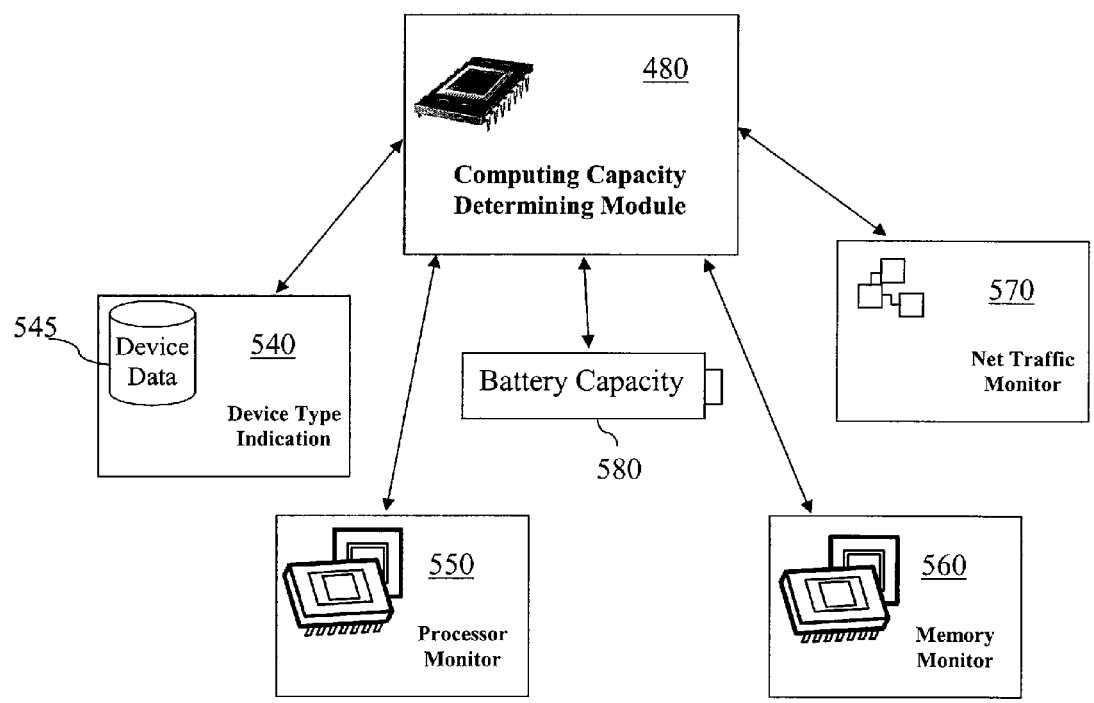
FIG. 4C illustrates an example arrangement of a computing capacity determining module of the security arrangement of FIG. 4A, according to one embodiment.

FIG. 4C illustrates several examples of the types of inputs received by computing capacity determining module 480 in one example embodiment. Input 540 is an indicator of the type of device that is PID 10. Computing capacity determining module 480 can also access device information database 545, which may reside locally or remotely from PID 10, and which contains performance measures of classifications of various types of devices. Since the device type can be a static item of information in many cases, this information may be determined during installation of the security arrangement onto PID 10. FIG. 4D is a table illustrating an example set of data contained in device information database 545. The display size, processor type, data store type and size, battery capacity, and communications provisions facilitate estimation of each device's performance characteristics, including the rate of battery drain. Another example of data in device information database is information that is produced by the Systeminfo utility for Windows XP by Microsoft Corporation.

FIG. 4E is another embodiment of a set of data contained in device information database 545, in which a predetermined performance score or rating is given to each type of device. Based on the performance rating, a particular configuration type may be determined, as illustrated in FIG. 4F. The configuration types shown in FIG. 4F can be established during installation of the security arrangement, during an update of the installation, or dynamically, according to various embodiments. A dynamically-configurable embodiment may be suitable in cases where upgradeability or expansion is possible, such as in devices facilitation expansion memory card slots (micro SD, for instance), or for devices for which higher-capacity batteries can be installed by the user.

Referring again to FIG. 4C, processor monitor 550 provides indicia of the load on the processor of PID 10, and provides a corresponding input to security configuration module 450. In one embodiment, processor monitor 550 measures the ratio of time in which the processor is in an idling state. For example, some processors utilize a reduced clock speed mode such as the Speedstep® feature by Intel Corporation or the Cool 'n Quiet™ feature by AMD Inc. during their idling state. Operation in these modes can be monitored and utilized in embodiments of the invention as a measure of processor load. Processor load is one type of indicator of the intensity of use that PID 10 is experiencing. This information is useful in determining the ability of PID 10 to handle running security module 400 in addition to the other applications that account for the loading on the processor. In similar fashion, memory monitor 560 monitors memory allocation, which is another measure of system load and capacity for running security module 400, and provides a corresponding input to security configuration module 450. In situations where the load on processor and memory resources of PID 10 is relatively higher, configuration module may temporarily configure security module 400 with a reduced functionality (if doing so is not inconsistent with the security needs in view of the current risk profile and user-specified tolerances).

Network traffic volume monitor 570 provides an input to security configuration module 450 indicating the present status of network traffic into, and out of, PID 10. Incoming and outgoing network traffic are informative as to the nature of the current use of PID 10. As a direct measure, the network traffic volume indicates available communications bandwidth that may be needed for certain types of configurations of security module 400. As an indirect measure, the network traffic volume, and the predominant direction of data flow, and the ratio of incoming to outgoing data volumes, collectively, are indicative of the user's intensity of use and corresponding needs for device performance. Security configuration module 450, in one embodiment, considers the input from network traffic volume monitor 570 as part of determining whether to configure security module 400 to operate in thin or thick client modes, the former requiring more communication bandwidth than the latter.

Battery capacity indication 580 provides battery status information to security configuration module 450. Battery status is informative of computing capacity limitations because, even though the processor, memory and communications bandwidth may be sufficient to support a robust security configuration, the computing load of the security module in that configuration would be more power-intensive. A situation in which there are limited energy reserves in PID 10 may dictate configuring security module 400 in a reduced load operating mode.

Referring again to FIG. 4A, security configuration module 450 can further receive an input from user input module 490, which enables the user of PID 10 to provide his or her preferences to be taken into consideration in configuring security module 400. In one embodiment, user input module 490 provides, via the user interface, a slider or other intuitive control operable by the user, with which the user can select a bias towards security, or a bias towards performance. For instance, in a situation where a user needs to browse the Web with particular urgency at a given moment, or run a graphics-intensive application smoothly, the user can set the slider control with a bias towards performance. In a related embodiment, user input module 490 provides a user control to facilitate selectively shutting down other background programs in addition to the security components that may be shut down to favor performance. In another situation, where the user intends to access personal or financial information, the user could set the slider control indicating a bias towards security.

Aspects of the invention contemplate that security configuration module can be programmed with any suitable decision logic for determining configuration settings for security module 400 based on the variety of inputs that it receives. Moreover, the decision logic may be selected or formulaically derived based on the device type. For example, a smartphone device with fewer computing resources and less communication bandwidth could have a decision profile that favors more aggressive responsiveness biased toward preserving performance, than a netbook-type device that has a more capable processor and more memory.

Different types of devices can also be configured to respond in different ways to similar situational circumstances. For instance, in a situation where the inputs to security configuration module 450 suggest reducing the computational load attributable to security module 400, Device A may preferentially migrate from a thick client configuration to a thin client configuration, as an initial response to the situation; whereas Device B may preferentially reduce functionality of security module 400 while security module 400 remains in a thick client mode.

In one type of embodiment, security configuration module 450 is programmed to balance the needs of preserving performance PID 10 while providing an adequate level of protection from security risks by computing a performance-risk vector from multi-variable inputs representing the security risk profile, as well as the computing capacity, and user input settings. Each variable of the multi-variable inputs can have a different weight assigned to it such that the corresponding input is given greater emphasis in the formula. In one example embodiment, some of the variables are weighted in the following order (from greatest to least weight):

Battery depletion;
User Preference;
Location;
Active Applications;
Network traffic; and
Current overall threat level.

Figure 5:
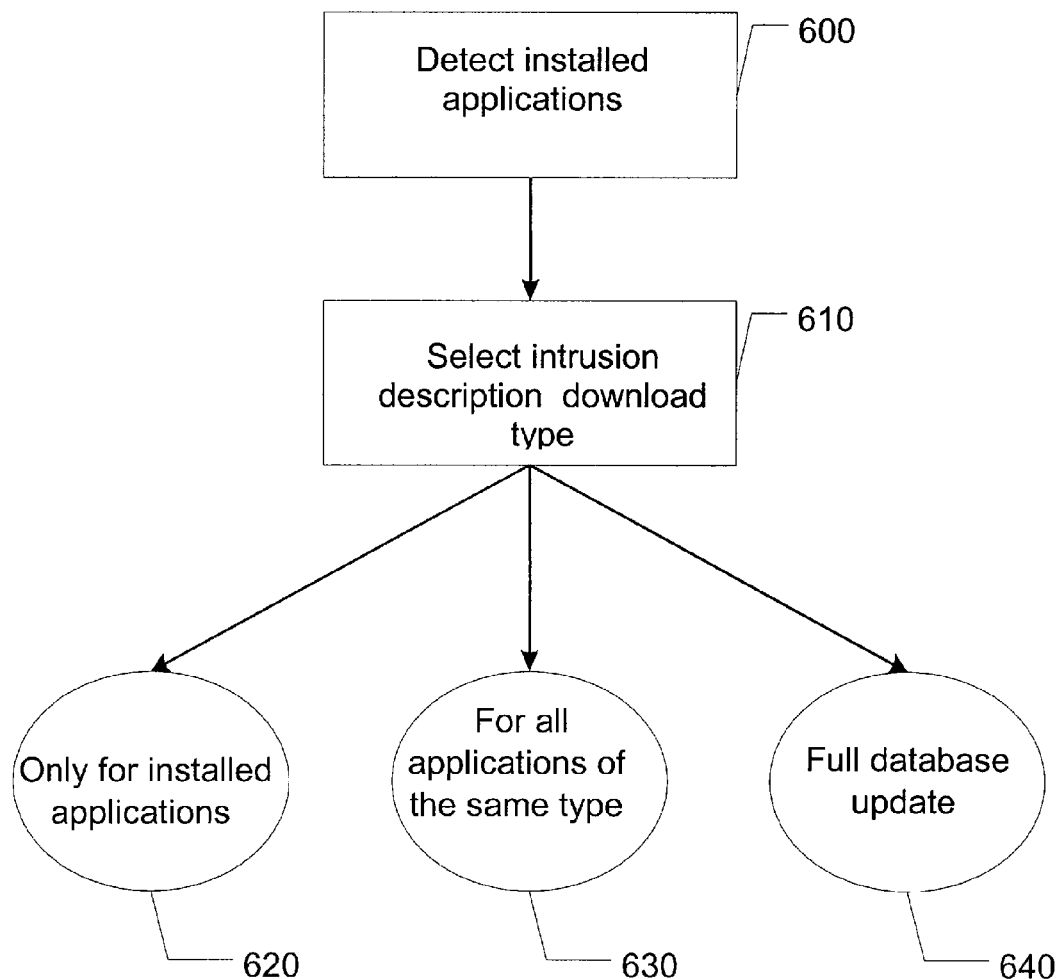
FIG. 5 is a flow diagram illustrating a decision process for determining the type of security threats database update that is to be performed according to one embodiment.

In another example of how security configuration module 450 can utilize inputs from risk profiling module 470 in conjunction with computing capacity determining module 480, FIG. 5 illustrates a decision process for determining the type of security threats database update that is to be performed according to one embodiment. At 600, application analysis module 510 detects the installed applications present on PID 10. Based on this list, at 610, application analysis module 510 selects from among three update options: option 620 would configure the threats database with updated threat descriptions for only the installed applications. Option 630 would configure the database to include descriptions of threats associated with the installed applications, plus additional threats that are associated with application programs having similar characteristics. For instance, in the case of Mozilla Firefox being an installed application, Option 630 would update the threat descriptions database with threats associated with Web browser programs in general. Option 640 would achieve a full configuration with all known threat definitions, as in a conventional security arrangement that does not include provisions for reducing its overall functionality. In one embodiment, selection from among the three options is based on the computing capacity as determined by computing capacity determining module 480, based on processor and memory capability and, optionally, as well as on current load conditions. In a related embodiment, the present battery life can be a factor in what type of updating is performed.

Figure 6:
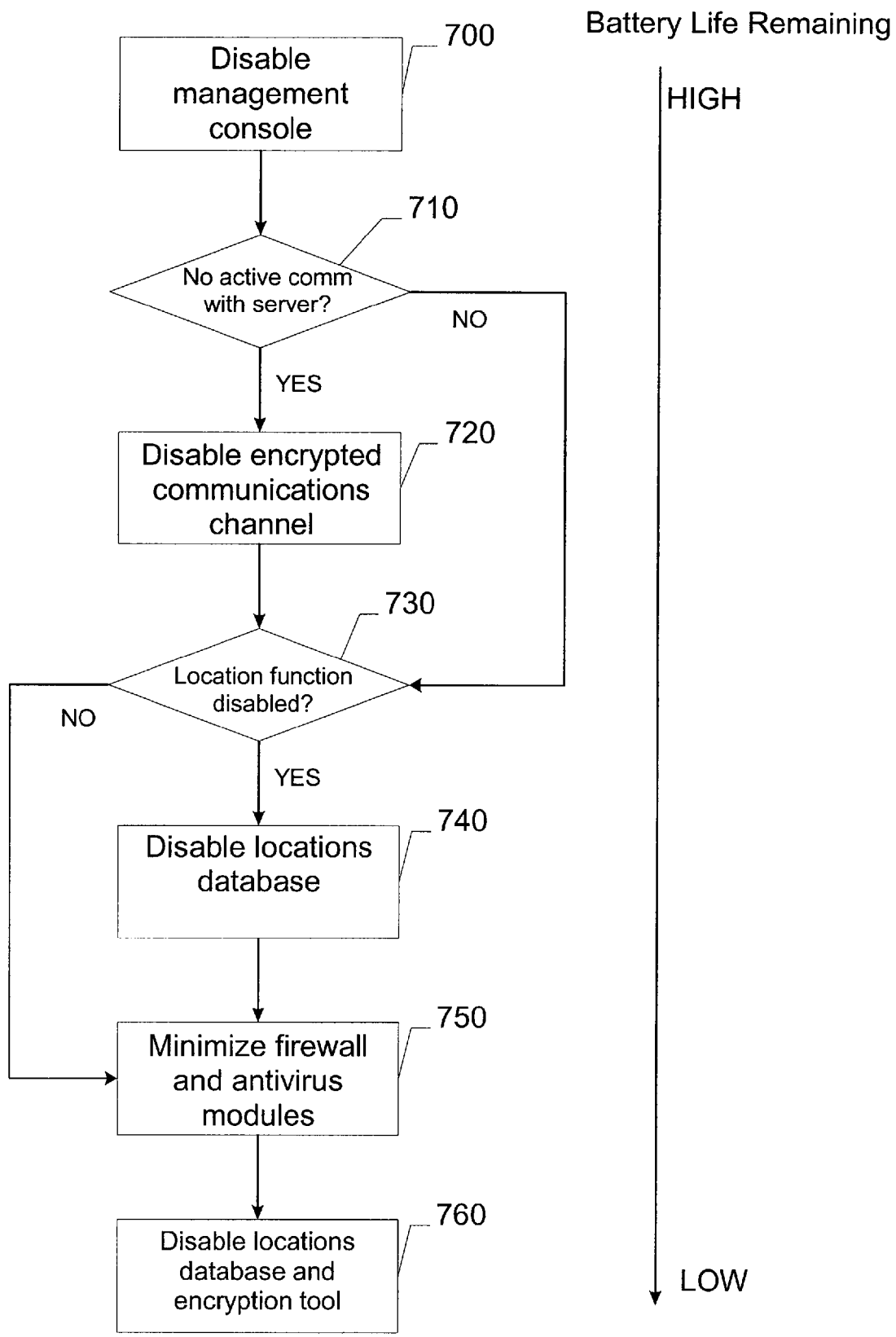
FIG. 6 is a flow diagram illustrating a simple example of how various security configurations can be selected as a function of remaining battery life according to one embodiment.

FIG. 6 is a flow diagram illustrating a simple example of how various security configurations can be selected as a function of battery life remaining. As the remaining battery life decreases from high to low with use of PID 10, the illustrated process is followed in sequence. In general, non-essential security functions are disabled first, and more essential security functions are disabled last. In the example of FIG. 6, a management console of the security system running on PID 10 is disabled first at 700. Since the management console is simply a user interface and does not itself perform security functions, it constitutes a load on system resources that is simply overhead.

At 710, the system determines whether there is any active communications with a remote security server. If there are active communications, that indicates the security module is operating in a configuration that relies on security server to some extent. In this case, disabling the encrypted communications channel that facilitates the connection to the server at 720 is skipped. If, on the other hand, the security module is not actively communicating with the security server, then the encryption modules can be disabled at 720. At 730, the system checks whether or not the location determining function is operational. If it is operational (i.e. not disabled), the related functionality of management of the locations database is left operational to support the location-based configurability functionality. If the location determining function is unused, the location database and any other related functionality is disabled at 740.

At 750, as the battery becomes further depleted, the firewall and antivirus functions are progressively minimized. One example of progressive minimization is described above with reference to FIG. 5, where the threat descriptions database is reduced to spend fewer system resources on addressing security risks that are less likely. Focusing on only those risks that are most pertinent to the present types of applications, or on only those particular applications installed on PID 10, provides a more efficient utilization of system resources spent on security.

As the battery continues to be drained further, the location determining and responding functions, and the communications functions are disabled at 760 to preserve system resources for only the most essential firewall and malware functions. At some point, a judgment would need to be exercised as to whether to disable security functions altogether so as to preserve system resources for only the applications being run, or whether the risk of operating the applications on PID 10 without any security is unacceptable. Accordingly, in one embodiment, when the battery reaches a critically low level, say, 10%, for example, the device prompts the user to authorize unsecured operation. In a related embodiment, user notifications are given at different stages of security system disablement, thereby giving the user the ability to adjust the behavior of resource management of PID 10.

Aspects of the invention contemplate that there are a virtually unlimited number of suitable approaches that can be implemented in the decision criteria of configuration determining module 460 to configure security module 400 based on the different inputs. Moreover, the there are many variants of types of configurations of security module 400 that could be achieved. Accordingly, the invention should not be limited beyond the limitations set forth in the claims below, to any particular illustrative example described herein.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An information device having a dynamically configurable security arrangement, the device comprising:
   computer circuitry, including a processor operatively coupled to a data store;
   a user interface, including display and user input devices;
   communications circuitry; and
   a power supply that provides power to the computer circuitry, user interface, and communications circuitry;
   wherein the computer circuitry includes a security arrangement comprising:
   a configurable security module that provides security-related functionality in the information device according to a configuration of operational settings;
   a risk profiling module that re-assesses a current set of security risks to which the information device is exposed;
   a computing capacity determining module that re-assesses computing capacity availability relating to usage and performance expectations for operation of the information device; and
   a security configuration module that automatically and dynamically configures the operational settings of the security module based on the current set of security risks from the risk profiling module and on the current state of dynamically-variable computing capacity availability from the computing capacity determining module, wherein the security configuration module includes:
      a configuration determining module that determines, from among a set of security-related functionality with which the security module is to be configured in response to the current set of security risks from the risk profiling module, a subset of more essential security functionality and a subset of less essential security functionality relevant to the current set of security risks; and
      a configuration setting module that sets the configuration of operational settings such that, in response to the computing capacity availability being indicative of a reduction of computing capacity availability from a previous computing capacity availability, the configuration setting module disables the subset of less essential security functionality to an extent that computational loading on the computer circuitry attributable to operation of the configurable security module is reduced to facilitate operation of the information device corresponding to the usage and performance expectations while executing the subset of more essential security functionality in the configurable security module.

2. The information device of claim 1, wherein the security configuration module progressively configures the operational settings of the security module in response to indicia of progressively-reducing computing capacity by progressively disabling security-related functionality in order of less essential functionality to more essential functionality to preserve computing capacity for non-security functions of the information device.

3. The information device of claim 2, wherein the configurable security module stores a plurality of threat definitions and scans at least one of the data store and network traffic for any presence of security threats based on the plurality of threat definitions, and wherein the computing capacity determining module disables a subset of less essential security functionality by reducing the quantity of threat definitions on which the scanning is based.

4. The information device of claim 2, wherein the configurable security module selectively implements combinations of different security functions, and wherein the computing capacity determining module disables the subset of less essential security functionality by selecting a thin client mode for the configurable security module in which a majority of security functions are executed on a remote server.

5. The information device of claim 1, wherein the risk profiling module includes:
 a location determining module configured to determine and provide an indication of a present location of the information device; and
 a location profile database containing security risk profile information for a plurality of local networks at a plurality of geographic locations;
 wherein the risk profiling module uses the indication of the present location to assess a present security risk to which the information device is exposed based on risk profile information contained in the location profile database corresponding to the present location.

6. The information device of claim 5, wherein the location determining module includes at least one of:
 a global positioning system (GPS) receiver; and
 a network topology analyzer.

7. The information device of claim 1, wherein the computing capacity determining module assesses a present demand on computing resources based on at least one monitored parameter selected from the group consisting of: system configuration information, operating state information, or any combination thereof.

8. The information device of claim 1, wherein the computing capacity determining module assesses available computing resources based on at least one parameter selected from the group consisting of: application programs in use, network traffic, processor idling, an amount of memory allocated, an amount of memory available in the data store, a condition of the on-board energy source, or any combination thereof.

9. The information device of claim 1, further comprising:
 a user preferences module that obtains at least one parameter from the user selected from the group consisting of: security risk tolerance information, user experience requirements, or any combination thereof;
 wherein the security configuration module configures the operational settings of the security module based on the at least one parameter.

10. The information device of claim 1, wherein the risk profiling module is adapted to assess security risks to which the information device is presently exposed based on at least one parameter selected from the group consisting of: relevant history of the information device, global security situational information, user preferences information, application programs installed or operating on the information device, or any combination thereof.

11. The information device of claim 1, wherein the set of security-related functionality includes a multi-level hierarchy of functionality ranging from general security functionality to particular security functionality corresponding more closely to the current set of security risks; and
 wherein the subset of more essential functionality is selected from a level of the multi-level hierarchy corresponding to the current state of computing capacity availability.

12. A method for automatically configuring an information device to facilitate usability while providing security protection for the information device, the method comprising:
 using a computing device, automatically profiling a set of current security risks to which the information device is exposed;
 using a computing device, automatically determining a set of security functionality with which a security module is to be configured in the information device to protect the information device in response to a result of the profiling of the set of current security risks;
 using a computing device, automatically re-assessing from among the set of security functionality, a subset of more essential security functionality and a subset of less essential security functionality relevant to the set of current security risks;
 using a computing device, automatically re-assessing current computing capacity availability relating to usage and performance expectations for operation of the information device; and
 using a computing device, automatically and dynamically configuring the security arrangement to run on the information device based on a result of the profiling of the current set of security risks and on a result of the re-assessing of the current computing capacity availability, including:
  in response to the result of the re-assessing of the current computing capacity availability being indicative of a reduction of computing capacity availability from a previous computing capacity availability, disabling the subset of less essential security functionality to an extent that computational loading on the information device attributable to operation of the configurable security module is reduced to facilitate operation of the information device corresponding to the usage and performance expectations while the information device executes the subset of more essential security functionality.

13. The method of claim 12, further comprising:
 using a computing device, automatically determining and providing an indication of a present location of the information device; and
 using a computing device, automatically looking up the present location in a location profile database, said database containing security risk profile information for a plurality of local networks at a plurality of geographic locations; and
 wherein the profiling of the set of security risks to which the information device is exposed is based on risk profile information contained in the location profile database corresponding to the present location.

14. The method of claim 13, wherein automatically determining the present location of the information device includes operating at least one of:
 a global positioning system (GPS) receiver; and
 a network topology analyzer.

15. The method of claim 12, further comprising:
 storing a plurality of threat definitions and scanning at least one of a data store and network traffic for any presence of security threats based on the plurality of threat definitions; and wherein the disabling of the subset of less essential security functionality includes reducing the quantity of threat definitions on which the scanning is based.

16. The method of claim 12, wherein at least one of: said automatically profiling a set of current security risks, said automatically determining a set of security functionality with which a security module is to be configured in the information device, said automatically re-assessing subsets of more essential and less essential security functionality, said automatically re-assessing computing capacity availability, and said automatically and dynamically configuring the security arrangement, is performed by the information device.

17. The method of claim 12, wherein automatically re-assessing the computing capacity includes assessing a present demand on computing resources based on at least one monitored parameter selected from the group consisting of: application programs in use on the information device, network traffic to or from the information device, processor idling of the information device, an amount of memory allocated on the information device, or any combination thereof.

18. The method of claim 12, wherein determining the computing capacity includes assessing available computing resources based on a condition of a battery of the information device.

19. The method of claim 12, further comprising:
    obtaining, by a computing device, at least one parameter from the user, said parameter being selected from the group consisting of: security risk tolerance information, user experience requirements, or any combination thereof; and
    wherein configuring the security module is performed based on the at least one parameter.

20. The method of claim 12, wherein automatically profiling the current set of security risks is performed based on application programs installed or operating on the information device.

* * * * *